US012592965B2

(12) United States Patent
Boué et al.

(10) Patent No.:  US 12,592,965 B2
(45) Date of Patent:  Mar. 31, 2026

(54) SECURITY SCORING FOR TYPOGRAPHICAL ERRORS

(71) Applicant: Microsoft Technology Licensing, LLC, Redmond, WA (US)

(72) Inventors: Laurent Boué, Petah Tikva (IL); Kiran Rama, Bangalore (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 206 days.

(21) Appl. No.: 18/347,673

(22) Filed: Jul. 6, 2023

(65) Prior Publication Data

US 2025/0016197 A1      Jan. 9, 2025

(51) Int. Cl.
*H04L 29/06* (2006.01)
*H04L 9/40* (2022.01)
(52) U.S. Cl.
CPC ................................. *H04L 63/1483* (2013.01)
(58) Field of Classification Search
CPC .................................................... H04L 63/1483
See application file for complete search history.

(56) References Cited

U.S. PATENT DOCUMENTS

| | | | |
|---|---|---|---|
| 2018/0217979 A1* | 8/2018 | Lin | G06F 40/284 |
| 2020/0106805 A1* | 4/2020 | Gronát | G06N 3/084 |
| 2021/0097168 A1* | 4/2021 | Patel | G06F 21/554 |
| 2024/0020116 A1* | 1/2024 | Chen | G06N 3/08 |

* cited by examiner

*Primary Examiner* — Wasika Nipa
(74) *Attorney, Agent, or Firm* — Holzer Patel Drennan

(57) ABSTRACT

A computing system generates transformation error probabilities by analyzing a training data set containing training strings, each transformation error probability indicating a probability that a per-character transformation applied to a character of a training string results in a typographical error in a resulting transformation string, wherein the training data set includes strings from a historical dataset of strings including typographical errors. The computing system populates a probabilistic graphical model with the transformation error probabilities corresponding to each resulting transformation string and predicts a likelihood that an input string contains a typographical error based on the probabilistic graphical model.

14 Claims, 7 Drawing Sheets

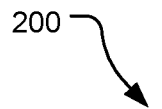
200
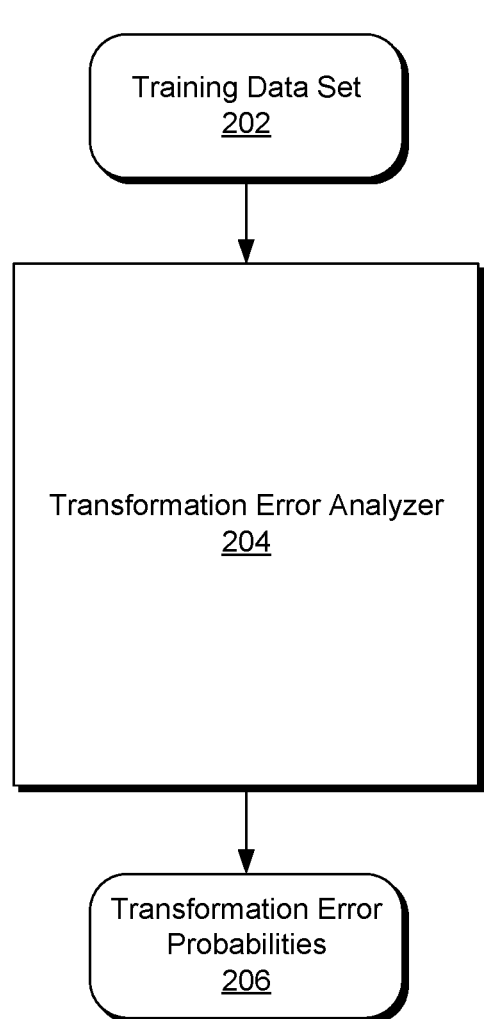
Training Data Set
202
Transformation Error Analyzer
204
Transformation Error
Probabilities
206
FIG. 2

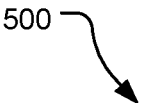

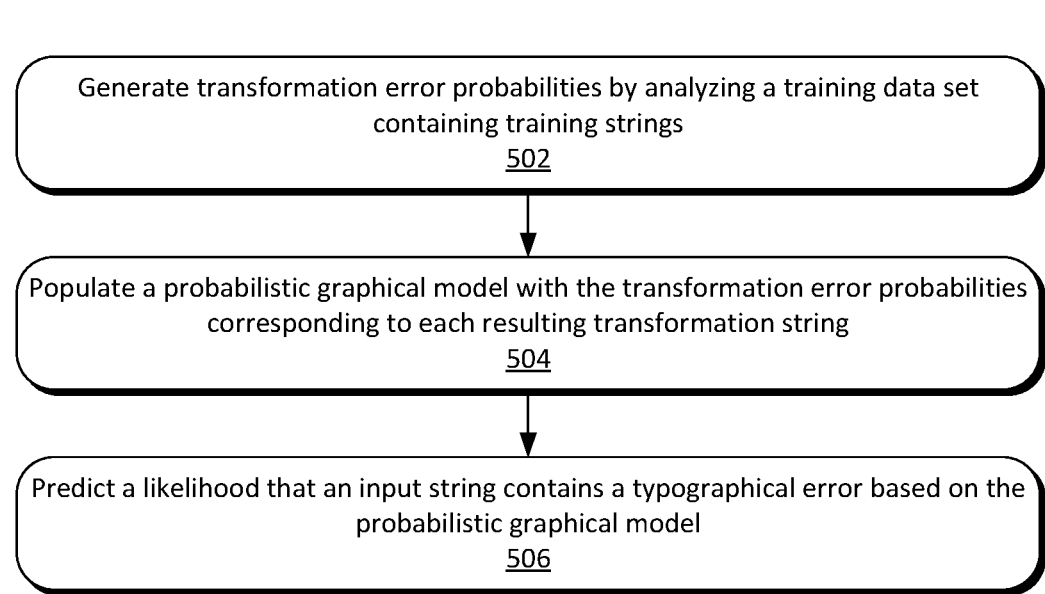

Generate transformation error probabilities by analyzing a training data set containing training strings
502

Populate a probabilistic graphical model with the transformation error probabilities corresponding to each resulting transformation string
504

Predict a likelihood that an input string contains a typographical error based on the probabilistic graphical model
506

FIG. 5

SECURITY SCORING FOR TYPOGRAPHICAL ERRORS

BACKGROUND

A user can enter a URL (Uniform Resource Locator) into an address bar or navigation bar of a browser to cause the browser to navigate to the website indicated by the URL. However, the user is also likely to enter a typographical error inadvertently when typing the URL, causing the browser to navigate to an unintended destination website. Moreover, some malicious actors have attempted to take advantage of this common but unintended occurrence to place malicious code at these unintended destination websites. For example, if a user accidentally types "www.uspto.com" instead of "www.uspto.gov," a malicious actor could cause the user's browser to download code from "www.uspto.com" that can be installed and/or executed on the user's computing device that would log keystrokes to track the user's web browsing, to silently download and install other malicious code with more sophisticated capabilities, etc. Alternatively, the malicious website may host a phishing effort intended to trick the user into entering sensitive information, such as bank account numbers and passwords. As such, innocent typographical errors entered into a navigation bar of a browser can present security risks.

SUMMARY

In some aspects, the techniques described herein relate to a method of detecting typographical errors, the method including: generating transformation error probabilities by analyzing a training data set containing training strings, each transformation error probability indicating a probability that a per-character transformation applied to a character of a training string results in a typographical error in a resulting transformation string, wherein the training data set includes strings from a historical dataset of strings including typographical errors; populating a probabilistic graphical model with the transformation error probabilities corresponding to each resulting transformation string; and predicting a likelihood that an input string contains a typographical error based on the probabilistic graphical model.

In some aspects, the techniques described herein relate to a computing system for detecting typographical errors, the computing system including: one or more hardware processors; a transformation error analyzer executable by the one or more hardware processors and configured to generate transformation error probabilities by analyzing a training data set containing training strings, each transformation error probability indicating a probability that a per-character transformation applied to a character of a training string results in a typographical error in a resulting transformation string; a graph model builder executable by the one or more hardware processors and configured to populate a probabilistic graphical model with the transformation error probabilities corresponding to each resulting transformation string; and an error detector executable by the one or more hardware processors and configured to predict a likelihood that an input string contains a typographical error based on the probabilistic graphical model.

In some aspects, the techniques described herein relate to one or more tangible processor-readable storage media embodied with instructions for executing on one or more processors and circuits of a computing device a process for detecting typographical errors, the process including: generating transformation error probabilities by analyzing a training data set containing training strings, each transformation error probability indicating a probability that a per-character transformation applied to a character of a training string results in a typographical error in a resulting transformation string; populating a probabilistic graphical model with the transformation error probabilities corresponding to each resulting transformation string; and predicting a likelihood that an input string contains a typographical error based on the probabilistic graphical model.

This summary is provided to introduce a selection of concepts in a simplified form. The concepts are further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTION OF THE FIGURES

FIG. 2 illustrates an example system for scoring transformations that can result in typographical error strings (e.g., typo URLs).

FIG. 5 illustrates example operations detecting a typographical error.

DETAILED DESCRIPTION

A user's computing device (e.g., a laptop computer, a mobile phone) can be compromised by a malicious website when a user inadvertently mistypes a URL into the navigation bar of a browser. For example, if the user inadvertently types "www.mybanc.com" instead of "www.mybank.com" into the navigation bar of the browser, the browser navigates to the "www.mybanc.com" website, which may contain malicious code or display a false user interface that imitates the "www.mybank.com" website to phish for sensitive information.

The described technology provides an unsupervised generative machine learning (ML) model that, given a known legitimate URL, creates a list of possible "typo URLs" (that may ultimately be used by "typosquatters") along with associated probability scores. These scores represent the probabilities that a user would actually input a typo URL identifying the wrong website instead of the intended URL. Furthermore, these scores can be generated to correspond with specific typographical errors (e.g., depending on the character and position of the typographical error or errors). This list can be output (e.g., via a user interface, a communication interface, a file system) and used by browser developers to prioritize which URLs should potentially be checked manually for potential typosquatting. The scores may also be used to alert users that they may be about to visit a typosquatting webpage. In some implementations, a high probability threshold may be used to avoid false positives in an effort to protect legitimate website visits.

Figure 1:
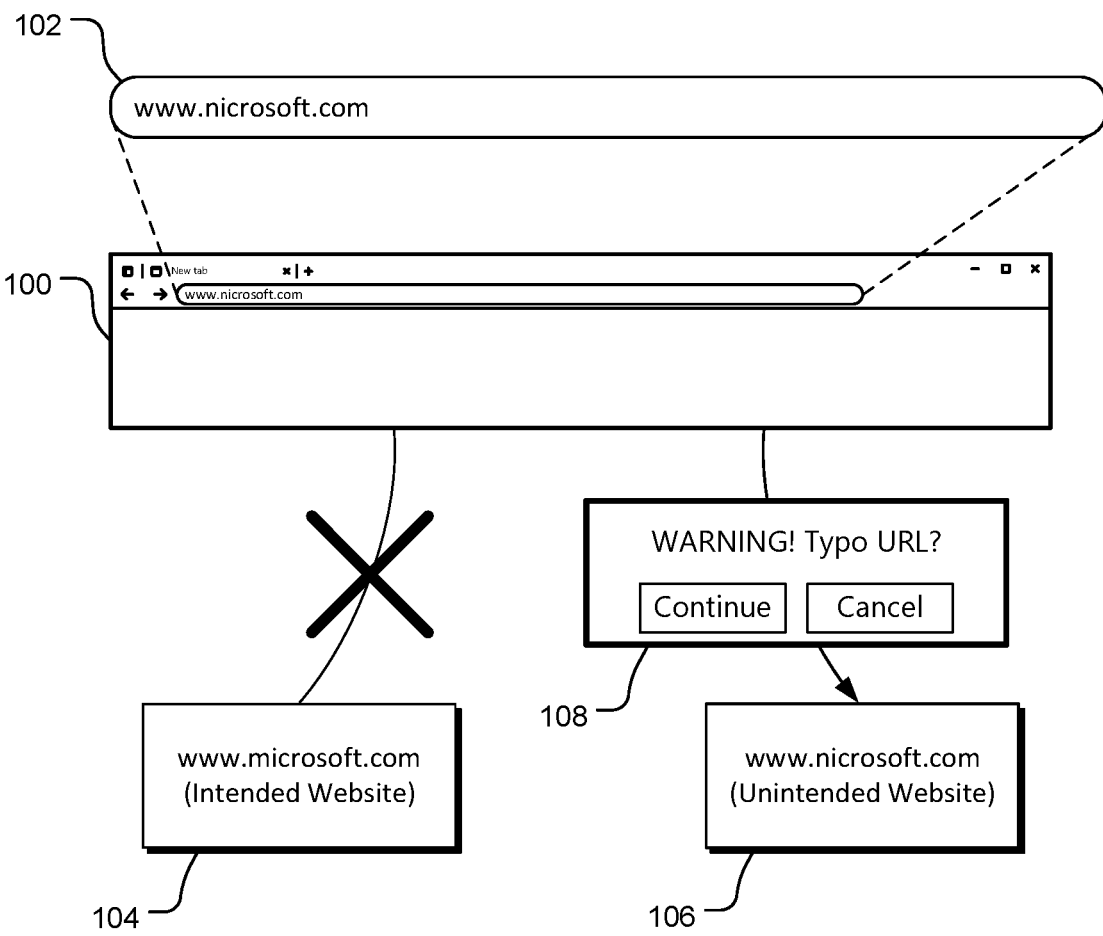
FIG. 1 illustrates example processing of a typo URL in a browser.

FIG. 1 illustrates example processing of a typo URL in a browser 100. The browser 100 is illustrated in a user interface window, although the term "browser" may also be used to refer to the browser application. A user has typed the URL "www.nicrosoft.com" into a navigation bar 102 (shown in s magnified format above the browser 100). Without the implementation of the described technology, the browser 100 would typically navigate to the destination indicated by the URL "www.nicrosoft.com," which in this case is a typo URL. Typically, the browser 100 would evaluate the "scheme," which may include, without limitation, https://, ftp://, mailto://, or file://. In the illustrated example, the scheme https://is assumed, which tells the browser 100 to connect to the destination site (e.g., a computing server) using Transport Layer Security or TLS, which is an encryption protocol to secure communications over the Internet.

The browser 100 also evaluates the domain name for the destination site, "www.nicrosoft.com" in this example. A domain name is a memorable identifier that maps to a specific server's IP address and can be acquired through a domain registration. Usually, a domain name consists of a website name and a domain name extension, both of which are at risk of a typographical error, although the website name is the larger risk. The browser 100 can look up (e.g., via a domain name system (DNS) server) the IP address that corresponds to the domain name and then navigate to the server at that IP address. The server can then return data (e.g., in HTML format), which the browser 100 can then convert and display as a webpage. Alternatively, or in addition, the server can return other data and instructions defined by the website owner, which may be renderable and/or executable by the browser or other aspects of the computing system (e.g., by the operating system or other executable entities). However, if the destination server indicated by the typo URL is a malicious site, the security of the computing device may be breached, such as by downloading malicious code and/or data.

Accordingly, it is assumed that the user intended to enter an intended URL of "www.microsoft.com" into the navigation bar 102 but instead typed the typo URL or "www.nicrosoft.com." Accordingly, absent the described technology, instead of navigating to an intended website 104 of "www-.microsoft.com," the browser 100 may attempt to navigate to an unintended website 106 of "www.nicrosoft.com," which may be unsafe. The described technology, however, can evaluate the URL entered into the navigation bar 102 and predict that the entered URL is likely to be a typo URL. The predictions can be generated when the user enters the full URL and presses "enter" and/or as the user types each character into the navigation bar 102. Responsive to this prediction, the browser 100 can, therefore, present an alert (e.g., alert 108) warning the user of a possible typo URL and giving the user the option to abort (e.g., cancel) the navigation to the destination site or continue with the navigation to the destination site. If navigation is aborted, the user can then correct the typographical error and navigate to the intended website 104. Accordingly, the predictions may be used to alert users that they may be about to visit a typosquatting webpage.

In at least one implementation, the predictions can be represented as scores or probabilities for each possible typographical error. A probability threshold may also be applied to reduce false positives (e.g., issuing a warning to a legitimate website) so as to protect legitimate website visits. For example, an entered URL may be identified as a potential typo URL if the probability for the entered URL exceeds a designated threshold (e.g., 75%).

In another implementation, the described technology may be used to generate a list of typo URLs corresponding to an intended URL with their respective probabilities of being a typo URL instead of the intended URL. This list can be used by browser developers to prioritize which URLs could or should be checked manually for potential typosquatting and possible addition to a URL blacklist or other navigation security facilities.

FIG. 2 illustrates an example system 200 for scoring transformations that can result in typographical error strings (e.g., typo URLs). In the illustrated implementation, a training data set 202 is input to a transformation error analyzer 204. Example training data sets may include, without limitation, historical error data, a data set of correct strings and typographical error strings, and/or browser telemetry. The transformation error analyzer 204 generates probabilities (e.g., transformation error probabilities 206) that indicate probabilities that per-character transformations applied to characters of training strings from the training data set 202 result in typographical errors. Each per-character transformation represents a character change in a training string from the training data set 202.

For example, one or more instances of a training string "www.nicrosoft.com" may be annotated as typographical errors in the training data set 202, specifically with the substitution of the initial 'm' in "www.microsoft.com" being identified as a transformation error. Other per-character transformations for different error types are described below. The transformation error analyzer 204 can evaluate single or multiple character transformation at various character positions between different training strings from the training data set 202.

Figure 3:
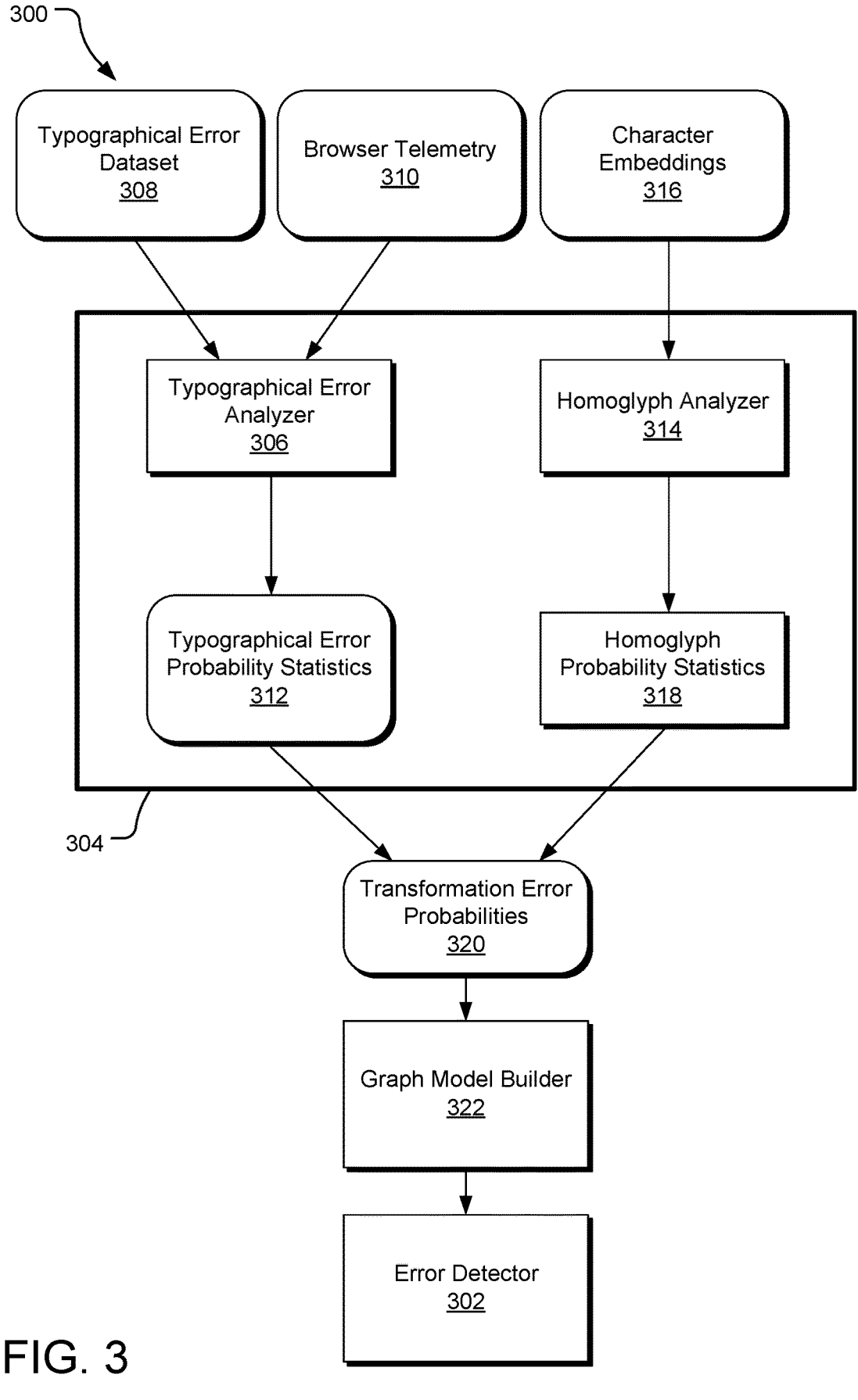
FIG. 3 illustrates an example system for building a Bayesian network (probabilistic graphical model) for detecting typographical errors in strings.

As described with regard to FIG. 3, the transformation error probabilities 206 can be used to build a Bayesian network (probabilistic graphical model) for use as an error detector (not shown in FIG. 2) for detecting typographical errors in a string, such as a URL string entered into a browser.

Typographical error strings can take many forms (e.g., error types) by application of various per-character transformations, including, without limitation:

Erroneous deletions of one or more characters in the intended URL (e.g., www.icrosoft.com)

Erroneous insertions of one or more characters in the intended URL (e.g., www.microsoft.com)

Erroneous substitutions of one or more characters in the intended URL (e.g., www.nicrosoft.com)

Erroneous replication of one or more characters in the intended URL (e.g., www.mmicrosoft.com)

Erroneous transposition of one or more characters in the intended URL (e.g., www.micorsoft.com)

In the case of URL strings, probability statistics apply to such various error types and the relative character position(s) of the error(s) within the URL and/or terms within the URL, although the described technology may be applied to non-URL strings. In at least one implementation, the mechanism that transforms a legitimate/intended URL string into another closely related but incorrect URL string can be decomposed into a series of unit steps, wherein each step is modeled by a random variable. In the description, the set of all possible unit steps (e.g., including error types and positions) in such transformations is denoted by the set $X=\{X_1, X_2, \ldots, X_n\}$, wherein $X_i$ represents a per-character transformation within a string.

For illustration purposes, the descriptions below relate to two different kinds of transformations, although other transformations may be applied: (1) typing errors and (2) homoglyphs (e.g., characters with shapes that appear very similar to each other, like diacritics and/or any other character from a character encoding, such as UTF-9 or Unicode). A diacritic, for example, is defined as a sign, such as an accent or cedilla, which, when written above or below a letter, indicates a difference in pronunciation from the same letter when unmarked or differently marked. In some aspects, homoglyphs may be considered a type of typing error (e.g., a substitution), although the handling of homoglyphs and variants thereof may be processed differently within the described technology.

Depending on the kind of transformation error, the random variable $X_i$ is represented as a tuple with the following schemas:

(A) Typing error: $X_i$=<affected character, position of character in the string, error type> (e.g., $X_i$=<'O', 0.15, insertion>, where the affected character (inserted character) is "O", the inserted position of the "O" is "0.15", and the typing error is of type "insertion"). In various implementations, the position value can be represented as a flowing point value (as shown in the example), an integer, or another representation. In the example, the floating point value indicates a relative position within the word, such that the inserted position is at 15% of the string. Alternatively, in the case of an integer, the value "3" can indicate a position at the third character in the string, although this approach does not provide a relative position based on the total number of characters in the string.

Typically, the error types may include "deletion", "insertion", "substitution", "replication", "transposition," etc. Each probability $P(X_i)$ is estimated using historical datasets of real-world typos via open-source datasets, such as a Twitter or GitHub corpus and/or by manually annotating datasets. Each probability may also be estimated via browser telemetry that gathers historical datasets of website misses (e.g., a navigation event to a website indicated by the URL string fails) and other informative behaviors. For example, browser telemetry that indicates whether a navigation event failed or was canceled or reversed after entering a URL can inform the probability estimation that the entered URL was likely not what the user intended.

A conditional probability table may be collected using these historical datasets. Those conditional probabilities consist of events such as $P(X_i$=error type 2|$X_j$=error type 1), which represents the probability of observing an error of type 2 after having already observed an error of type 1 in a training string.

(B) Homoglyphs: $X_i$=<affected letter, homoglyph letter> (e.g., $X_i$=<'n', 'ñ'>), where 'n' is the affected letter and 'n' is the replacement homoglyph letter. In this case, the probability $P(X_i)$ is estimated using a pre-trained deep learning model (e.g., a pre-trained deep learning vision model). All pairs of characters in a data set of character embeddings pertaining to homoglyphs are given similarity scores normalized into probabilities. For example, for the character 'n', the cosine similarity between its embedding from the vision model (embedding=vector representation of the last layer) with the embeddings from all other characters can be calculated, yielding a list of tuples [<n, char1, similarity score1>, <n, char2, similarity score2>, . . . , <n, charP, similarity scoreP>], where P is the number of characters in the character encoding. The similarity scores are normalized so that their sum is equal to 1 and can all be interpreted individually as probabilities $P(X_i)$.

In this case, a model (e.g., a handwriting character recognition model) can be used for sentences, and the pre-final layer could be trained. The distance between the embeddings for the character and all other characters can be computed, and the normalized probability can be calculated. In summary, the probabilities $P(X_i))$ described with respect to (A) and (B) above may be used to characterize each random variable in X. Furthermore, these probabilities $P(X_i)$ may be combined to yield a transformation error probability for each per-character transformation of the training string (see transformation error probabilities 206).

FIG. 3 illustrates an example system 300 for building a Bayesian network (probabilistic graphical model) for detecting typographical errors in strings. The tuples corresponding to the transformation errors described with respect to FIG. 2 and their corresponding probabilities may be combined together into a Bayesian network that can be used as an error detector 302.

A transformation error analyzer 304 can contribute tuples and probabilities for different types of transformation errors, including, without limitations typing errors and homoglyphs. For typing errors, addressed by the left side of FIG. 3, a typographical error analyzer 306 receives training strings from a historical typographical error database 308, browser telemetry 310, and/or other sources of historical string input information. For example, training data can include lists of URL strings attributed with a label indicating whether they are legitimate URLs (e.g., safe websites). Generally, the training data can include a set of general text strings, including legitimate and illegitimate strings (e.g., typos) in a given language. The typographical error analyzer 306 generates transformation error probabilities corresponding to different per-character transformations applied to training strings and generates the typographical error probability statistics 312 as described with respect to FIG. 2.

For homoglyphs, addressed by the right side of FIG. 3, a homoglyph analyzer 314 receives training data from a data set of homoglyph character embeddings 316. The data set includes embeddings for the homoglyphs of individual characters (e.g., 'è', 'é', 'ê', 'ë', 'ē', 'ĕ', 'ę' in association with 'e'). The homoglyph analyzer 314 may implement a pre-trained deep learning model to generate similarity scores (e.g., based on cosine similarity or another similarity measure) on all pairs of characters in the transformation error analyzer 304, which are normalized into homoglyph probability statistics 318. The typographical error probability statistics 312 and homoglyph probability statistics 318 are output from the transformation error analyzer 304 and collected as transformation error probabilities 320.

To populate the probabilistic graphical model (including a graph-see, e.g., FIG. 6), a graph model builder 322, in at least one implementation, iterates through known, legitimate strings (e.g., valid URL strings), such as those from the training data or other sources, generating nodes and branches in the graph to represent string variants of the legitimate string based on per-character transformations. The graph model builder 322 starts with the first character of a first legitimate string and creates one branch in a graph from this first character node that leaves this character untouched and simply moves on to the second character in the first legitimate string. The other branch connects to the relevant random variables $X_i$ depending on the value of this first character. Each one of these random variables is used to generate a new string that yields a string variant of the first legitimate string. The graph model builder 322, in this implementation, then moves on to the second character in the first legitimate string. Once again, the graph model builder 322 splits the graph into two branches where one branch leaves the character untouched and the second one connects to all the relevant random variables $X_i$ associated with the affected character. The graph model builder 322 continues on until it reaches the final character in the string. At this point, the graph model builder 322 has created many new strings that include misspellings and/or homoglyphs of the original string. Each one of these string variants can be attributed a joint probability by running inference on the Bayesian network, as shown below:

$$P = P(X_1) \cdot P(X_2 = x_2 \lfloor X_1 = x_1) \cdot$$

$$P(X_2 = x_2 \lfloor X_1 = x_1) \cdot P(X_3 = x_3 | X_1 = x_1, X_2 = x_2)$$

where all the probabilities and their conditional probabilities have been compiled when processing the transformation errors described above with respect to (A) and (B) above. Note that the relative probability of typos vs. homoglyphs can be left as a user-adjustable parameter. It can be given a default value of 0.1 to reflect the fact that homoglyphs are less likely to occur than simpler typing mistakes.

The graph model builder 322 can produce a list with the following schema of error scores for strings 1-T:

Potential_typosquatting string1, probability 1
. . .
Potential_typosquatting stringT, probability T where "Potential_typosquatting_string" represents a legitimate string or a string variant generated in the multi-string, per-character iterations performed by the graph model builder 322 and "probability" represents the transformation error probability attributed to the legitimate string or string variant by the transformation error analyzer 304.

Figure 4:
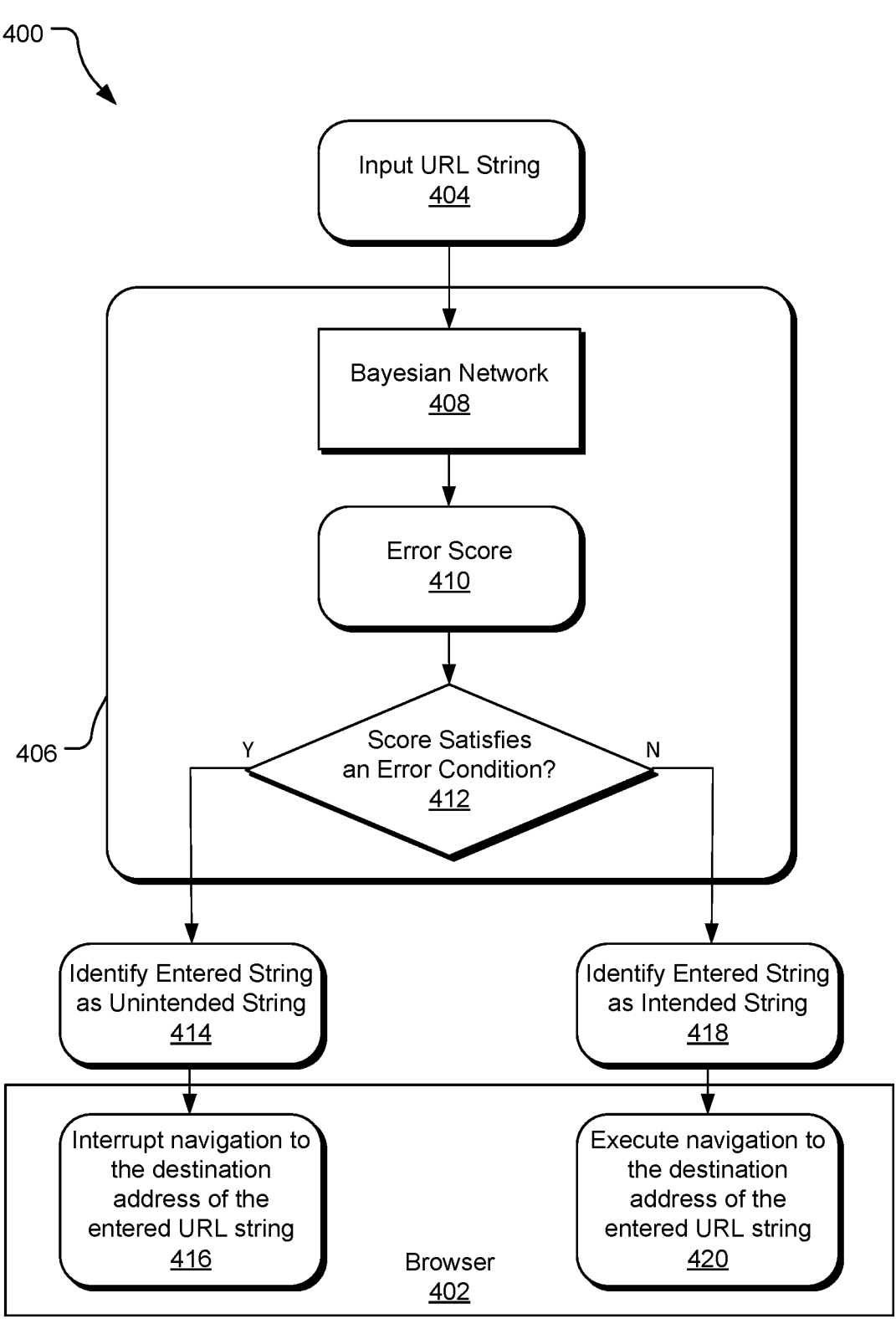
FIG. 4 illustrates example operations for processing a URL string in a browser to detect a typographical error.

FIG. 4 illustrates example operations 400 for processing a URL string in a browser 402 to detect a typographical error. An inputting operation 404 receives a URL string entered into a navigation bar of the browser 402, although similar processing can be applied to non-URL strings obtained via other input means. An error detection operation 406 analyzes the URL string using the probabilities generated by a Bayesian network 408 (an example probabilistic graphical model, such as that generated by the graph model builder 322 of FIG. 3). The error detection operation 406 extracts the transformation error probability generated Bayesian network 408 and corresponding to the URL string, yielding an error score 410. A decision sub-operation 412 of the error detection operation 406 evaluates the error score 410 against an error condition (e.g., whether the error score exceeds a threshold). If so, an identifying operation 414 identifies the URL string as an unintended string (e.g., a typographical error) and the browser 402 interrupts navigation to the destination address corresponding to the entered URL string in a navigation management operation 416.

The interruption of navigation by the browser represents an example of navigation management responsive to the detection of a potential typo URL. Other implementations of navigation management may include, without limitation, presenting an alert via a user interface and tracking/filtering/quarantining results of navigation (e.g., downloaded data, program code, scripts).

If the decision sub-operation 412 determines that the error score does not satisfy the error condition (e.g., does not exceed a threshold), an identifying operation 418 identifies the URL string as an intended string (e.g., not a typographical error) and the browser 402 navigates to the destination address corresponding to the entered URL string in a navigation management operation 420. It should be understood that the error condition can be tuned to minimize false positives or to maximize the probability of catching a typo URL.

FIG. 5 illustrates example operations 500 detecting a typographical error. A generating operation 502 generates transformation error probabilities by analyzing a training data set containing training strings. Each transformation error probability indicates a probability that a per-character transformation applied to a character of a training string results in a typographical error in a resulting transformation string. Some of the transformation error probabilities may be conditional probabilities representing a probability that a transformation error occurs after having already observed a previous transformation error in the resulting transformation string.

In some implementations, each training string in the training data set is annotated as a typographical error string or a typographically accurate string. The generating operation 502 may determine the probability that a transformation string of a training string is a typographical error based on a position of a per-character transformation within the transformation string and a type of per-character transformation. The per-character transformation represents a character change between the training string and the transformation string. Furthermore, the transformation error probabilities may include a conditional probability that the transformation string includes a second transformation error after a first transformation is observed.

In some implementations, the training data set includes browser telemetry data containing URL strings input to a browser navigation bar and annotated by whether the navigation of a corresponding browser to a corresponding URL indicates a typographical error. In this context, a per-character transformation can be applied to a training string to replace a character of a training string with a homoglyph of the character. As such, the generating operation can include determining a probability that a transformation string resulting from replacing a character of a training string with a homoglyph of the character of each training string is a typographical error based on a similarity measure between an embedding of the character and an embedding of a homoglyph that replace the character in the transformation string.

A populating operation 504 populates a probabilistic graphical model with the transformation error probabilities corresponding to each resulting transformation string. Examples of populating operation implementations are described with respect to FIG. 3.

A prediction operation 506 predicts a likelihood that an input string contains a typographical error based on the probabilistic graphical model. In some implementations, the likelihood of a given input string containing a typographical error is represented as an error score extracted from a Bayesian network. The error score can be evaluated against an error condition to indicate whether the input string contains a typographical error (e.g., if the error score exceeds a threshold). A browser can use this prediction to manage navigation, such as deciding whether to execute or interrupt navigation to a URL indicated by the input string.

In alternative implementations, the operations 500 can contribute to a list of strings and their error scores to allow a browser developer to identify potential websites to evaluate for security reasons or to generally rank the likelihoods that a given string is a typographical error, such as in a spell checker or an autocorrect utility. For example, the rankings of error codes may also be used to identify potential spelling errors and to better identify which per-character transformations can be applied to autocorrect a typographical error in any text string.

In some implementations, the input string includes a URL entered into a navigation bar of a browser, and the browser or other entity manages navigation of the browser to a destination address corresponding to the URL based on the likelihood that the input string contains a typographical error. For example, the browser may interrupt navigation if the URL is deemed to be a typographical error.

Figure 6:
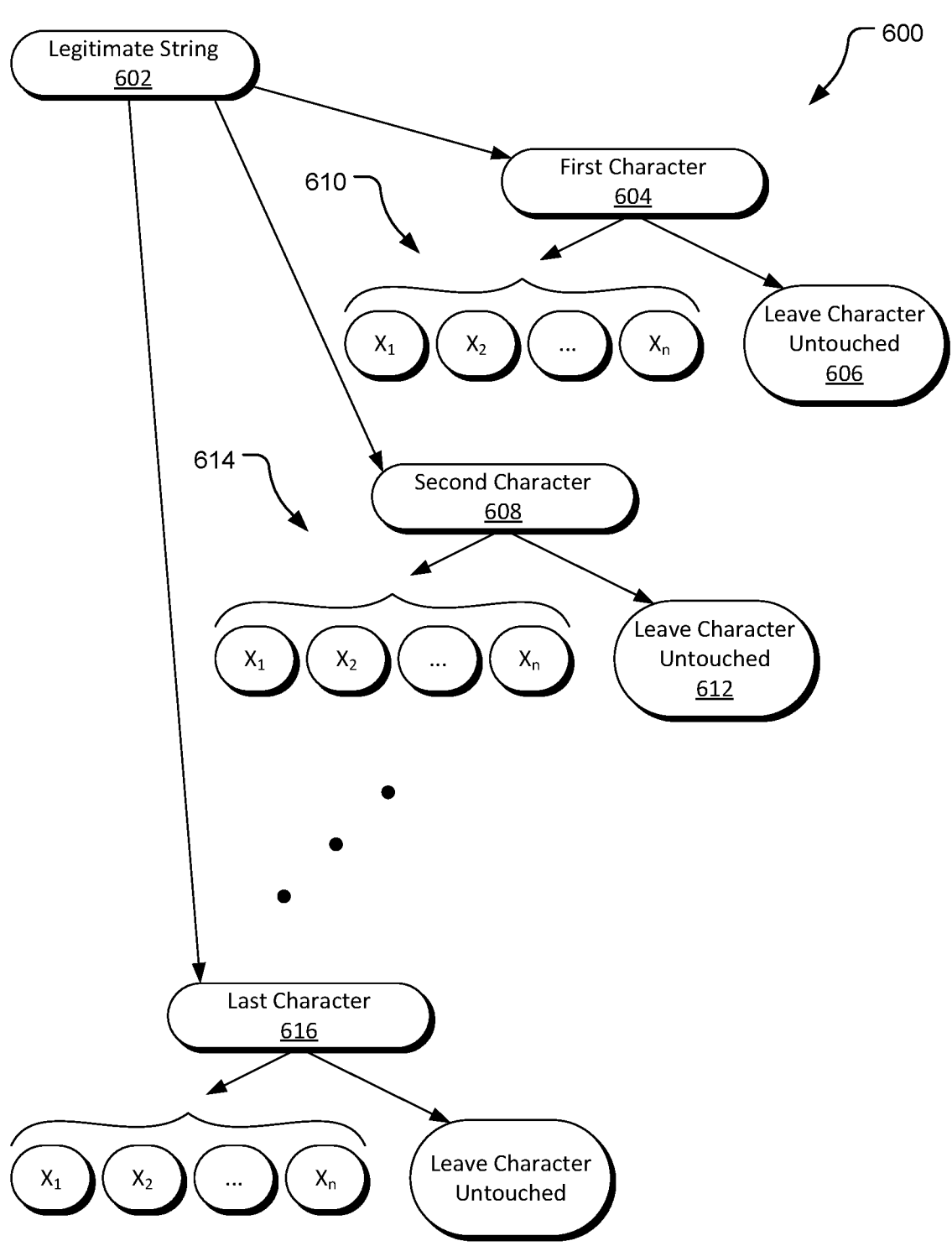
FIG. 6 illustrates an example graph generated by an example graph model builder.

FIG. 6 illustrates an example graph 600 generated by an example graph model builder. The graph model builder, in at least one implementation, iterates through known, legitimate strings (e.g., valid URL strings) and generates nodes and branches in the graph to represent string variants of the legitimate string based on per-character transformations. FIG. 6 illustrates a legitimate string 602. The graph model builder starts with the first character 604 of the legitimate string 602 and creates one branch in a graph from this first character node that leaves this character untouched (see node 606) and simply moves on to the second character 608 in the legitimate string 602. The other branch connects to the relevant random variables $X_i$ (see elements 610), depending on the value of the first character 604. Each of these random variables is used to generate a new string (not shown) that yields a string variant of the legitimate string 602. The graph model builder, in this implementation, then moves on to the second character 608 in the legitimate string 602. Once again, the graph model builder splits the graph into two branches where one branch leaves the character untouched (see node 612) and the second one connects to all the relevant random variables $X_i$ (see elements 614) associated with the affected character. The graph model builder continues on until it reaches the final character 616 in the legitimate string 602. Additional strings may be processed in the same fashion. Other graph structures may be employed.

Figure 7:
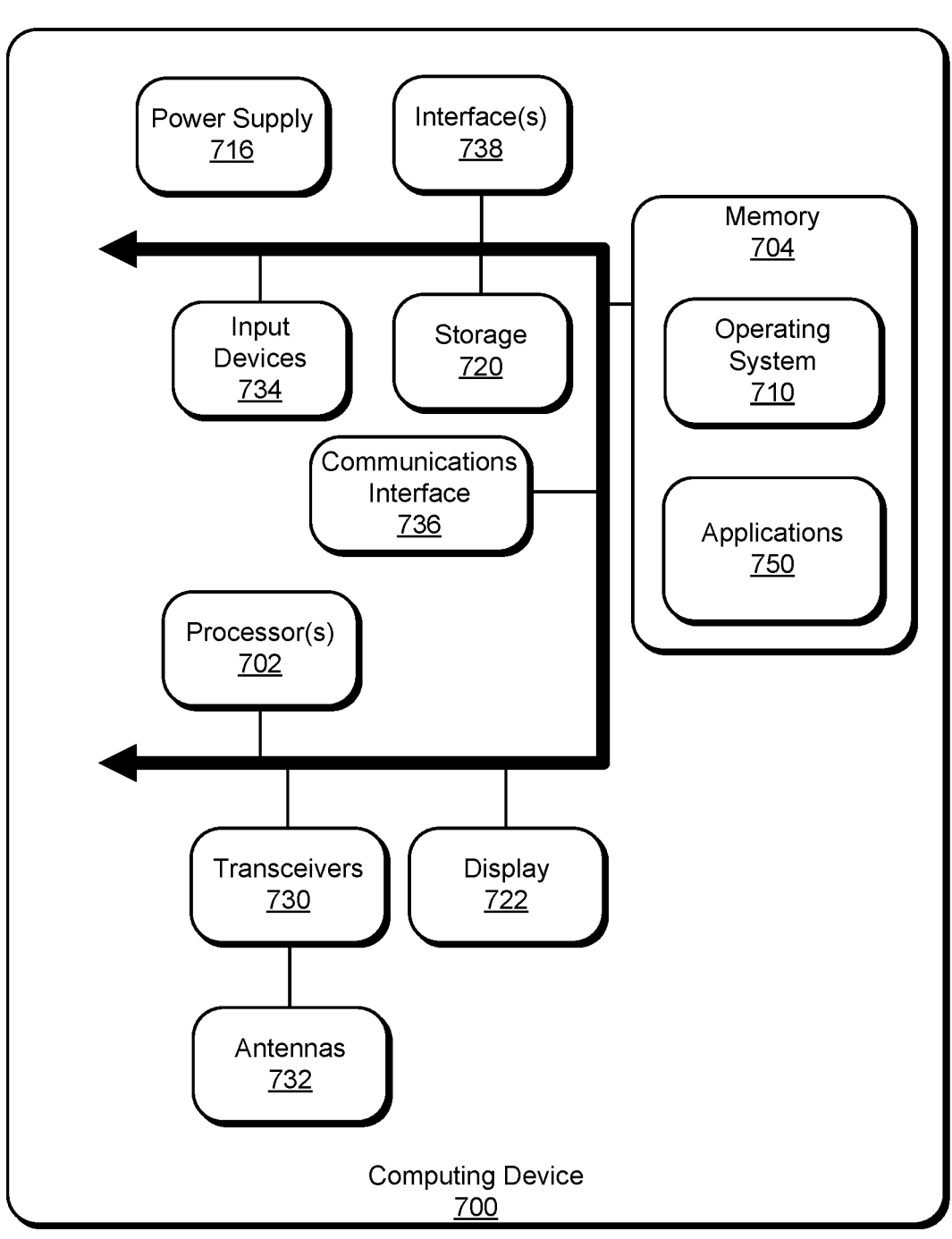
FIG. 7 illustrates an example computing device for use in implementing the described technology.

FIG. 7 illustrates an example computing device 700 for use in implementing the described technology. The computing device 700 may be a client computing device (such as a laptop computer, a desktop computer, or a tablet computer), a server/cloud computing device, an Internet-of-Things (IoT), any other type of computing device, or a combination of these options. The computing device 700 includes one or more processor(s) 702 and a memory 704. The memory 704 generally includes both volatile memory (e.g., RAM) and nonvolatile memory (e.g., flash memory), although one or the other type of memory may be omitted. An operating system 710 resides in the memory 704 and is executed by the processor(s) 702. In some implementations, the computing device 700 includes and/or is communicatively coupled to storage 720.

In the example computing device 700, as shown in FIG. 7, one or more modules or segments, such as applications 750, a browser application, a transformation error analyzer, a typographical error analyzer, a homoglyph analyzer, a graph model builder, an error detector, a probabilistic graph model (e.g., a Bayesian network), and other program code and modules are loaded into the operating system 710 on the memory 704 and/or the storage 720 and executed by the processor(s) 702. The storage 720 may store training strings, training string annotations, transformation error probabilities, browser telemetry, character embeddings for homoglyphs, typographical error probability statistics, homoglyph probability statistics, error scores, error conditions, error thresholds, and other data and be local to the computing device 700 or may be remote and communicatively connected to the computing device 700. In particular, in one implementation, components of a system for detecting typographical errors may be implemented entirely in hardware or in a combination of hardware circuitry and software.

The computing device 700 includes a power supply 716, which may include or be connected to one or more batteries or other power sources, and which provides power to other components of the computing device 700. The power supply 716 may also be connected to an external power source that overrides or recharges the built-in batteries or other power sources.

The computing device 700 may include one or more communication transceivers 730, which may be connected to one or more antenna(s) 732 to provide network connectivity (e.g., mobile phone network, Wi-Fi®, Bluetooth®) to one or more other servers, client devices, IoT devices, and other computing and communications devices. The computing device 700 may further include a communications interface 736 (such as a network adapter or an I/O port, which are types of communication devices). The computing device 700 may use the adapter and any other types of communication devices for establishing connections over a wide-area network (WAN) or local-area network (LAN). It should be appreciated that the network connections shown are exemplary and that other communications devices and means for establishing a communications link between the computing device 700 and other devices may be used.

The computing device 700 may include one or more input devices 734 such that a user may enter commands and information (e.g., a keyboard, trackpad, or mouse). These and other input devices may be coupled to the server by one or more interfaces 738, such as a serial port interface, parallel port, or universal serial bus (USB). The computing device 700 may further include a display 722, such as a touchscreen display.

The computing device 700 may include a variety of tangible processor-readable storage media and intangible processor-readable communication signals. Tangible processor-readable storage can be embodied by any available media that can be accessed by the computing device 700 and can include both volatile and nonvolatile storage media and removable and non-removable storage media. Tangible processor-readable storage media excludes intangible communications signals (such as signals per se) and includes volatile and nonvolatile, removable and non-removable storage media implemented in any method or technology for storage of information such as processor-readable instructions, data structures, program modules, or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage, or other magnetic storage devices, or any other tangible medium which can be used to store the desired information and which can be accessed by the computing device 700. In contrast to tangible processor-readable storage media, intangible processor-readable communication signals may embody processor-readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Clause 1. A method of detecting typographical errors, the method comprising: generating transformation error probabilities by analyzing a training data set containing training strings, each transformation error probability indicating a probability that a per-character transformation applied to a character of a training string results in a typographical error in a resulting transformation string, wherein the training data set includes strings from a historical dataset of strings including typographical errors; populating a probabilistic graphical model with the transformation error probabilities corresponding to each resulting transformation string; and predicting a likelihood that an input string contains a typographical error based on the probabilistic graphical model.

Clause 2. The method of clause 1, wherein each training string in the training data set is annotated as a typographical error string or a typographically accurate string and generating the transformation error probabilities comprises: determining the probability that a transformation string of a training string is a typographical error based on a position of a per-character transformation within the transformation string and a type of per-character transformation, wherein the per-character transformation represents a character change between the training string and the transformation string.

Clause 3. The method of clause 2, wherein the transformation error probabilities include a conditional probability that the transformation string includes a second transformation error after a first transformation is observed.

Clause 4. The method of clause 1, further comprising: generating a list of string variants corresponding to the input string; and outputting the list of string variants with an error score attributed to each string variant, wherein the error score represents a likelihood that a corresponding string variant contains a typographical error predicted based on the probabilistic graphical model.

Clause 5. The method of clause 1, wherein the training data set includes browser telemetry data containing URL strings input to a browser navigation bar and annotated by whether navigation of a corresponding browser to a corresponding URL indicates a typographical error.

Clause 6. The method of clause 1, wherein a per-character transformation applied to a training string includes replacing a character of a training string with a homoglyph of the character.

Clause 7. The method of clause 1, wherein generating the transformation error probabilities comprises: determining a probability that a transformation string resulting from replacing a character of a training string with a homoglyph of the character of each training string is a typographical error based on a similarity measure between an embedding of the character and an embedding of a homoglyph that replaces the character in the transformation string.

Clause 8. A computing system for detecting typographical errors, the computing system comprising: one or more hardware processors; a transformation error analyzer executable by the one or more hardware processors and configured to generate transformation error probabilities by analyzing a training data set containing training strings, each transformation error probability indicating a probability that a per-character transformation applied to a character of a training string results in a typographical error in a resulting transformation string; a graph model builder executable by the one or more hardware processors and configured to populate a probabilistic graphical model with the transformation error probabilities corresponding to each resulting transformation string; and an error detector executable by the one or more hardware processors and configured to predict a likelihood that an input string contains a typographical error based on the probabilistic graphical model.

Clause 9. The computing system of clause 8, wherein each per-character transformation is selected from a set consisting of character deletion, character insertion, character substitution, character replication, and character transposition.

Clause 10. The computing system of clause 9, wherein each training string in the training data set is annotated as a typographical error string or a typographically accurate string and the transformation error analyzer is further configured to determine the probability that a transformation string of a training string is a typographical error based on a position of the per-character transformation within the transformation string and a type of per-character transformation, wherein the per-character transformation represents a character change between the training string and the transformation string.

Clause 11. The computing system of clause 8, further comprising: a user interface executable by the one or more hardware processors; and a browser executable by the one or more hardware processors, wherein the input string includes a URL entered into a navigation bar of the browser and the browser is configured to present an alert via the user interface and to manage navigation of the browser to a destination address corresponding to the URL based on the likelihood that the input string contains a typographical error.

Clause 12. The computing system of clause 8, wherein the training data set includes browser telemetry data containing URL strings input to a browser navigation bar and annotated by whether navigation of a corresponding browser to a corresponding URL indicates a typographical error.

Clause 13. The computing system of clause 8, wherein a per-character transformation applied to a training string includes replacing a character of a training string with a homoglyph of the character.

Clause 14. The computing system of clause 8, wherein the transformation error analyzer is configured to determine a probability that a transformation string resulting from replacing a character of a training string with a homoglyph of the character of each training string is a typographical error based on a similarity measure between an embedding of the character and an embedding of a homoglyph that replace the character in the transformation string.

Clause 15. One or more tangible processor-readable storage media embodied with instructions for executing on one or more processors and circuits of a computing device a process for detecting typographical errors, the process comprising: generating transformation error probabilities by analyzing a training data set containing training strings, each transformation error probability indicating a probability that a per-character transformation applied to a character of a training string results in a typographical error in a resulting transformation string; populating a probabilistic graphical model with the transformation error probabilities corresponding to each resulting transformation string; and predicting a likelihood that an input string contains a typographical error based on the probabilistic graphical model.

Clause 16. The one or more tangible processor-readable storage media of clause 15, wherein each per-character transformation is selected from a set consisting of character deletion, character insertion, character substitution, character replication, and character transposition.

Clause 17. The one or more tangible processor-readable storage media of clause 16, wherein each training string in the training data set is annotated as a typographical error string or a typographically accurate string and generating the transformation error probabilities comprises: determining the probability that a transformation string of a training string is a typographical error based on a position of the per-character transformation within the transformation string and a type of per-character transformation, wherein the per-character transformation represents a character change between the training string and the transformation string.

Clause 18. The one or more tangible processor-readable storage media of clause 15, wherein the training data set includes strings from a historical dataset of strings including typographical errors.

Clause 19. The one or more tangible processor-readable storage media of clause 15, wherein the training data set includes browser telemetry data containing URL strings input to a browser navigation bar and annotated by whether navigation of a corresponding browser to a corresponding URL indicates a typographical error.

Clause 20. The one or more tangible processor-readable storage media of clause 15, wherein generating the transformation error probabilities comprises: determining a probability that a transformation string resulting from replacing a character of a training string with a homoglyph of the character of each training string is a typographical error based on a similarity measure between an embedding of the character and an embedding of a homoglyph that replaces the character in the transformation string.

Clause 21. A method of detecting typographical errors, the method comprising: means for generating transformation error probabilities by analyzing a training data set containing training strings, each transformation error probability indicating a probability that a per-character transformation applied to a character of a training string results in a typographical error in a resulting transformation string, wherein the training data set includes strings from a historical dataset of strings including typographical errors; means for populating a probabilistic graphical model with the transformation error probabilities corresponding to each resulting transformation string; and means for predicting a likelihood that an input string contains a typographical error based on the probabilistic graphical model.

Clause 22. The system of clause 21, wherein each training string in the training data set is annotated as a typographical error string or a typographically accurate string and means for generating the transformation error probabilities comprises: means for determining the probability that a transformation string of a training string is a typographical error based on a position of a per-character transformation within the transformation string and a type of per-character transformation, wherein the per-character transformation represents a character change between the training string and the transformation string.

Clause 23. The system of clause 22, wherein the transformation error probabilities include a conditional probability that the transformation string includes a second transformation error after a first transformation is observed.

Clause 24. The system of clause 21, wherein the input string includes a URL entered into a navigation bar of a browser and further comprising: means for managing navigation of the browser to a destination address corresponding to the URL based on the likelihood that the input string contains a typographical error.

Clause 25. The system of clause 21, wherein the training data set includes browser telemetry data containing URL strings input to a browser navigation bar and annotated by whether navigation of a corresponding browser to a corresponding URL indicates a typographical error.

Clause 26. The system of clause 21, wherein a per-character transformation applied to a training string includes replacing a character of a training string with a homoglyph of the character.

Clause 27. The system of clause 21, wherein means for generating the transformation error probabilities comprises: means for determining a probability that a transformation string resulting from replacing a character of a training string with a homoglyph of the character of each training string is a typographical error based on a similarity measure between an embedding of the character and an embedding of a homoglyph that replaces the character in the transformation string.

Clause 28: The system of clause 21, further comprising: means for generating a list of string variants corresponding to the input string; and means for outputting the list of string variants with an error score attributed to each string variant, wherein the error score represents a likelihood that a corresponding string variant contains a typographical error predicted based on the probabilistic graphical model.

Some implementations may comprise an article of manufacture, which excludes software per se. An article of manufacture may comprise a tangible storage medium to store logic and/or data. Examples of a storage medium may include one or more types of computer-readable storage media capable of storing electronic data, including volatile memory or nonvolatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described embodiments. The executable computer program instructions may include any suitable types of code, such as source code, compiled code, interpreted code, executable code, static code, dynamic code, and the like. The executable computer program instructions may be implemented according to a predefined computer language, manner, or syntax, for instructing a computer to perform a certain operation segment. The instructions may be implemented using any suitable high-level, low-level, object-oriented, visual, compiled, and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed is:

1. A method of detecting typographical errors, the method comprising:

generating transformation error probabilities by analyzing a training data set containing training strings, wherein generating the transformation error probabilities includes determining a probability that a transformation string of a training string is a typographical error based on a position of a per-character transformation within the transformation string and a type of per-character transformation, wherein the per-character transformation represents a character change between the training string and the transformation string, and determining a probability that a transformation string resulting from replacing a character of a training string with a homoglyph of the character of each training string is a typographical error based on a similarity measure between an embedding of the character and an embedding of a homoglyph that replaces the character in the transformation string, each transformation error probability indicating a probability that a per-character transformation applied to a character of a training string results in a typographical error in a resulting transformation string, wherein the training data set includes strings from a historical dataset of strings including typographical errors and each training string in the training data set is annotated as a typographical error string or a typographically accurate string;

populating a probabilistic graphical model with the transformation error probabilities corresponding to each resulting transformation string; and predicting a likelihood that an input string contains a typographical error based on the probabilistic graphical model.

2. The method of claim 1, wherein the transformation error probabilities include a conditional probability that the transformation string includes a second transformation error after a first transformation is observed.

3. The method of claim 1, further comprising:

generating a list of string variants corresponding to the input string; and outputting the list of string variants with an error score attributed to each string variant, wherein the error score represents a likelihood that a corresponding string variant contains a typographical error predicted based on the probabilistic graphical model.

4. The method of claim 1, wherein the training data set includes browser telemetry data containing URL strings input to a browser navigation bar and annotated by whether navigation of a corresponding browser to a corresponding URL indicates a typographical error.

5. The method of claim 1, wherein a per-character transformation applied to a training string includes replacing a character of a training string with a homoglyph of the character.

6. A computing system for detecting typographical errors, the computing system comprising:

one or more hardware processors;

a transformation error analyzer executable by the one or more hardware processors and configured to generate transformation error probabilities by analyzing a training data set containing training strings, wherein generating the transformation error probabilities includes determining a probability that a transformation string of a training string is a typographical error based on a position of a per-character transformation within the transformation string and a type of per-character transformation, wherein the per-character transformation represents a character change between the training string and the transformation string, and determining a probability that a transformation string resulting from replacing a character of a training string with a homoglyph of the character of each training string is a typographical error based on a similarity measure between an embedding of the character and an embedding of a homoglyph that replaces the character in the transformation string, each transformation error probability indicating a probability that a per-character transformation applied to a character of a training string results in a typographical error in a resulting transformation string, wherein the training data set includes strings from a historical dataset of strings including typographical errors and each training string in the training data set is annotated as a typographical error string or a typographically accurate string;

a graph model builder executable by the one or more hardware processors and configured to populate a probabilistic graphical model with the transformation error probabilities corresponding to each resulting transformation string; and an error detector executable by the one or more hardware processors and configured to predict a likelihood that an input string contains a typographical error based on the probabilistic graphical model.

7. The computing system of claim 6, wherein each per-character transformation is selected from a set consisting of character deletion, character insertion, character substitution, character replication, and character transposition.

8. The computing system of claim 6, further comprising:

a user interface executable by the one or more hardware processors; and a browser executable by the one or more hardware processors, wherein the input string includes a URL entered into a navigation bar of the browser and the browser is configured to present an alert via the user interface and to manage navigation of the browser to a destination address corresponding to the URL based on the likelihood that the input string contains a typographical error.

9. The computing system of claim 6, wherein the training data set includes browser telemetry data containing URL strings input to a browser navigation bar and annotated by whether navigation of a corresponding browser to a corresponding URL indicates a typographical error.

10. The computing system of claim 6, wherein a per-character transformation applied to a training string includes replacing a character of a training string with a homoglyph of the character.

11. One or more tangible processor-readable storage media embodied with instructions for executing on one or more processors and circuits of a computing device a process for detecting typographical errors, the process comprising:

generating transformation error probabilities by analyzing a training data set containing training strings, wherein generating the transformation error probabilities includes determining a probability that a transformation string of a training string is a typographical error based on a position of a per-character transformation within the transformation string and a type of per-character transformation, wherein the per-character transformation represents a character change between the training string and the transformation string, and determining a probability that a transformation string resulting from replacing a character of a training string with a homoglyph of the character of each training string is a typographical error based on a similarity measure between an embedding of the character and an embedding of a homoglyph that replaces the character in the transformation string, each transformation error probability indicating a probability that a per-character transformation applied to a character of a training string results in a typographical error in a resulting transformation string, wherein the training data set includes strings from a historical dataset of strings including typographical errors and each training string in the training data set is annotated as a typographical error string or a typographically accurate string;

populating a probabilistic graphical model with the transformation error probabilities corresponding to each resulting transformation string; and predicting a likelihood that an input string contains a typographical error based on the probabilistic graphical model.

12. The one or more tangible processor-readable storage media of claim 11, wherein each per-character transformation is selected from a set consisting of character deletion, character insertion, character substitution, character replication, and character transposition.

13. The one or more tangible processor-readable storage media of claim 11, wherein the training data set includes strings from a historical dataset of strings including typographical errors.

14. The one or more tangible processor-readable storage media of claim 11, wherein the training data set includes browser telemetry data containing URL strings input to a browser navigation bar and annotated by whether navigation of a corresponding browser to a corresponding URL indicates a typographical error.

\* \* \* \* \*